(12) United States Patent
Steinbach et al.

(10) Patent No.: US 8,311,904 B2
(45) Date of Patent: Nov. 13, 2012

(54) ARCHITECTURAL DESIGN FOR INTRA-COMPANY STOCK TRANSFER APPLICATION SOFTWARE

(75) Inventors: Jochen Steinbach, Bad Schoenborn (DE); Andreas Poth, Weingarten (DE); Achim Heger, Meckesheim (DE); Stephan Hetzer, Oestringen-Eichelberg (DE); Klaus Reinelt, Kraichtal (DE); Renzo Colle, Stutensee (DE); Jens Freund, Heidelberg (DE)

(73) Assignee: SAP AG, Walldorf (DE)

( * ) Notice: Subject to any disclaimer, the term of this patent is extended or adjusted under 35 U.S.C. 154(b) by 1014 days.

(21) Appl. No.: 12/327,737

(22) Filed: Dec. 3, 2008

(65) Prior Publication Data

US 2010/0138258 A1    Jun. 3, 2010

(51) Int. Cl.
    *G06Q 10/00*    (2012.01)
(52) U.S. Cl. ......... 705/28; 705/7.12; 709/202; 717/120; 717/121
(58) Field of Classification Search .................. None
    See application file for complete search history.

(56) References Cited

U.S. PATENT DOCUMENTS

| | | | |
|---|---|---|---|
| 4,947,321 A | 8/1990 | Spence et al. |
| 5,361,198 A | 11/1994 | Harmon et al. |
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Nobel et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |

(Continued)

FOREIGN PATENT DOCUMENTS

WO    00/23874    4/2000

(Continued)

OTHER PUBLICATIONS

"American Software Announces ASP Pricing Model for It's a-Applications Expense Business Solution"; PR Newswire; Mar. 6, 2000; 2 pages.

(Continued)

*Primary Examiner* — Jamie Kucab
(74) *Attorney, Agent, or Firm* — Fish & Richardson P.C.

(57) ABSTRACT

Methods, systems, and apparatus, including computer program products, for implementing a software architecture design for a software application implementing intra-company stock transfer of physical inventory. The application is structured as multiple process components interacting with each other through service operations, each implemented for a respective process component. The process components include a Supply and Demand Matching process, a Customer Requirement Processing process component, a Logistics Execution Control process component, a Site Logistics Processing process component, an Outbound Delivery Processing process component, an Inbound Delivery Processing process component, an Inventory Processing process component, a Production and Site Logistics Auxiliaries process component and a Freight Documents Processing process component.

16 Claims, 10 Drawing Sheets

U.S. PATENT DOCUMENTS

| | | |
|---|---|---|
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadhiro |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |

| | | |
|---|---|---|
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1* | 7/2007 | Kaetker et al. ............... 705/1 |
| 2007/0156474 A1 | 7/2007 | Scherberger et al. |
| 2007/0156475 A1 | 7/2007 | Berger et al. |
| 2007/0156476 A1* | 7/2007 | Koegler et al. ............... 705/7 |
| 2007/0156482 A1 | 7/2007 | Bagheri |
| 2007/0156489 A1* | 7/2007 | Berger et al. ............... 705/8 |
| 2007/0156493 A1 | 7/2007 | Tebbe et al. |
| 2007/0156499 A1 | 7/2007 | Berger et al. |
| 2007/0156500 A1* | 7/2007 | Merkel et al. ............... 705/9 |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1* | 7/2007 | Moosmann et al. ......... 717/121 |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1* | 8/2007 | Kaetker et al. ............... 717/104 |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1* | 10/2007 | Suenderhauf et al. ............ 705/8 |

| | | | |
|---|---|---|---|
| 2007/0233541 A1* | 10/2007 | Schorr et al. ............ 705/8 | |
| 2007/0233545 A1 | 10/2007 | Cala et al. | |
| 2007/0233574 A1* | 10/2007 | Koegler et al. .......... 705/26 | |
| 2007/0233575 A1* | 10/2007 | Berger et al. ............ 705/26 | |
| 2007/0233581 A1* | 10/2007 | Peter ...................... 705/27 | |
| 2007/0233598 A1* | 10/2007 | Der Emde et al. ....... 705/40 | |
| 2007/0234282 A1* | 10/2007 | Prigge et al. ............. 717/107 | |
| 2007/0239508 A1 | 10/2007 | Fazal et al. | |
| 2007/0239569 A1 | 10/2007 | Lucas et al. | |
| 2007/0265860 A1* | 11/2007 | Herrmann et al. ....... 705/1 | |
| 2007/0265862 A1 | 11/2007 | Freund et al. | |
| 2008/0004929 A9 | 1/2008 | Raffel et al. | |
| 2008/0017722 A1 | 1/2008 | Snyder et al. | |
| 2008/0027831 A1 | 1/2008 | Gerhardt | |
| 2008/0065437 A1 | 3/2008 | Dybvig | |
| 2008/0120129 A1 | 5/2008 | Seubert et al. | |
| 2008/0147507 A1 | 6/2008 | Langhammer | |
| 2008/0162382 A1 | 7/2008 | Clayton et al. | |
| 2008/0208707 A1 | 8/2008 | Erbey et al. | |
| 2008/0215354 A1 | 9/2008 | Halverson et al. | |
| 2008/0263152 A1 | 10/2008 | Daniels et al. | |
| 2008/0300959 A1 | 12/2008 | Sinha et al. | |
| 2009/0037287 A1 | 2/2009 | Baitalmal et al. | |
| 2009/0037492 A1 | 2/2009 | Baitalmal et al. | |
| 2009/0063112 A1 | 3/2009 | Hader et al. | |
| 2009/0171716 A1 | 7/2009 | Suenderhauf et al. | |
| 2009/0171818 A1 | 7/2009 | Penning et al. | |
| 2009/0172699 A1 | 7/2009 | Jungkind et al. | |
| 2009/0189743 A1 | 7/2009 | Abraham et al. | |
| 2009/0192858 A1 | 7/2009 | Johnson | |
| 2010/0070324 A1 | 3/2010 | Bock et al. | |
| 2010/0070331 A1 | 3/2010 | Koegler et al. | |
| 2010/0070336 A1 | 3/2010 | Koegler et al. | |
| 2010/0070395 A1 | 3/2010 | Elkeles et al. | |
| 2010/0070555 A1 | 3/2010 | Duparc et al. | |
| 2010/0100464 A1 | 4/2010 | Ellis et al. | |
| 2010/0138269 A1 | 6/2010 | Cirpus et al. | |
| 2011/0252395 A1 | 10/2011 | Charisius et al. | |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Bin et al.; "Component Model Optimization for Distributed Real-Time Embedded Software"; IEEE International Conference on Systems, Man and Cybernetics; Oct. 13, 2004; 6 pages.

Cascallar, Eduardo et al.; "Assessment in the Evaluation of Self-Regulation as a Process"; Educational Psychology Review; vol. 18, No. 3; Sep. 2006; pp. 297-306.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cool, David W.; "Activity Fund Accounting"; School Business Affairs; vol. 49, No. 6; Jun. 1983; pp. 50-52.

Cox et al.; "A Formal Model for Component Based Software"; IEEE; Aug. 7, 2002; 8 pages.

Ferscha et al.; "A Light-Weight Component Model for Peer-to-Peer Applications"; IEEE; Mar. 23, 2004.

Finin et al.; "KQML as an Agent Communication Language"; retrieved on Jul. 26, 2011; pp. 456-463. <http://portal.acm.org/citation.cfm?id=191322>.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

"Oracle Expands E-Commerce Offerings with the Acquisition of E-Travel, Inc."; PR Newswire; Mar. 9, 1999; 3 pages.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,236 on Oct. 28, 2010; 19 pages.

Notice of Allowance issued in U.S. Appl. No. 12/233,554 on May 14, 2010; 11 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Notice of Allowance issued in U.S. Appl. No. 11/322,482; Jul. 13, 2010; 5 pages.

Office Action issued in U.S. Appl. No. 11/323,590; Jun. 21, 2010; 25 pages.

Office Action issued in U.S. Appl. No. 11/323,634 on Apr. 29, 2011; 8 pages.

Office Action issued in U.S. Appl. No. 11/322,973 on Dec. 7, 2010; 13 pages.

Office Action issued in U.S. Appl. No. 11/322,973 on May 27, 2011; 15 pages.

Office Action issued in U.S. Appl. No. 11/322,383; May 12, 2010; 23 pages.

Notice of Allowance issued in U.S. Appl. No. 11/396,327 on Nov. 30, 2010; 28 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Notice of Allowance issued in U.S. Appl. No. 12/233,462 on Feb. 2, 2011; 11 pages.

Notice of Allowance issued in U.S. Appl. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,457 on May 26, 2011; 19 pages.

Office Action issued in U.S. Appl. No. 11/967,483 on Aug. 20, 2010; 10 pages.

Office Action issued in U.S. Appl. No. 11/967,483 on Mar. 4, 2011; 6 pages.

Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Office Action issued in U.S. Appl. No. 11/322,772; Jul. 12, 2010; 18 pages.
Advisory Action issued in U.S. Appl. No. 11/323,041 on Jun. 7, 2010; 3 pages.
Advisory Action issued in U.S. Appl. No. 11/322,612; Jun. 24, 2010; 3 pages.
Notice of Allowance issued in U.S. Appl. No. 12/233,534 on Jun. 24, 2010; 15 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Jun. 14, 2010; 6 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Notice of Allowance issued in U.S. Appl. No. 11/396,288; May 20, 2010; 15 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Office Action issued in U.S. Appl. No. 11/322,851; May 12, 2010; 15 pages.
Notice of Allowance issued in U.S. Appl. No. 11/322,851 on Sep. 2, 2011; 8 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040; Apr. 29, 2010; 17 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Jun. 25, 2010; 16 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
"Hudson's Bay Company Realizes Fast ROI with the Oracle E-Business Suite"; PR Newswire; New York; Jan. 15, 2002; p. 1.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Office Action issued in U.S. Appl. No. 11/322,772; Dec. 9, 2009; 14 pages.
Office Action issued in U.S. Appl. No. 11/322,398 on Apr. 2, 2010; 39 pages.
Office Action issued in U.S. Appl. No. 11/322,383; Nov. 12, 2009; 29 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Notice of Allowance issued in U.S. Appl. No. 11/396,259 on Mar. 29, 2010; 19 pages.
Office Action issued in U.S. Appl. No. 11/396,288; Aug. 19, 2009; 20 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,851; Sep. 2, 2009; 32 pages.
Office Action issued in U.S. Appl. No. 11/323,040; Jul. 24, 2009; 35 pages.
Office Action issued in U.S. Appl. No. 11/322,612; Apr. 1, 2010; 23 pages.
Notice of Allowance issued in U.S. Appl. No. 11/397,026 on Mar. 29, 2010; 17 pages.
Notice of Allowance issued in U.S. Appl. No. 11/967,865 on Mar. 31, 2010; 16 pages.
Office Action issued in U.S. Appl. No. 11/397,029; Jul. 21, 2009;28 pages.
Office Action issued in U.S. Appl. No. 11/322,482; Jan. 7, 2010; 19 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on the Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Anonymous; "Mastering Management"; Motor Age, vol. 25, No. 10; Oct. 2006; pp. 1-3.

Gerin et al.; "Flexible and Executable Hardware/Software Interface Modeling for Multiprocessor SOC Design Using SystemC"; IEEE; 2007; pp. 390-395.

Hahn; "A Domain Specific Modeling Language for Multi-Agent Systems"; ACM AAMAS; 2008; pp. 233-240.

Hu; "A Co-Design Modeling Approach for Computer Network Systems"; IEEE; 2007; pp. 685-693.

"IDe Partners with Journyx to Offer Customers Best-in-Class Time Management Solution"; PR Newswire; Mar. 8, 2005; Business Dateline.

Kremic, Tibor; "Outsourcing Decision Support: A Survey of Benefits, Risks, and Decision Factor"; Supply Chain Management; V. 11; 2006; pp. 467-482.

Meseroll, Robert; "Data Mining Navy Flight"; IEEE Autotestcom 2007; Sep. 2007; pp. 476-481.

Sarjoughian et al.; "CoSMOs: A Visual Environment for Component Based Modeling, Experimental Design and Simulation"; ACM; 2009; pp. 1-9.

Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.

"Trakware Systems Inc. Expands Management Team: Leading To-Order Software Provider Adds Experienced Global VP Sales and Marketing to its World-Class Team"; Canada NewsWire; Apr. 9, 2008.

Trappey, Amy; "Design and Analysis of a Rule Based Knowledge"; International Journal of Manufacturing Tech; Dec. 2007; 35,3-4:385-93.

Vescovi, Marcos and Hagmann, Christian; "Rules Engine for Enterprise System"; Aerospace & High Technology, ANTE: Abstracts in New Technologies and Engineering; Metadex, Mechanical & Transportation Engineering Abstracts; Date Unknown; p. 1.

Notice of Allowance issued in U.S. Appl. No. 12/233,550 on Jan. 9, 2012; 11 pages.

Office Action issued in U.S. Appl. No. 12/333,146 on Feb. 2, 2012; 21 pages.

Notice of Allowance issued in U.S. Appl. No. 11/323,634 on Jan. 25, 2012; 5 pages.

Notice of Allowance issued in U.S. Appl. No. 11/396,327 on Sep. 28, 2011; 31 pages.

Office Action issued in U.S. Appl. No. 12/233,479 on Oct. 27, 2011; 24 pages.

Office Action issued in U.S. Appl. No. 12/332,965 on Oct. 11, 2011; 6 pages.

Notice of Allowance in U.S. Appl. No. 12/233,462 on Dec. 12, 2011; 6 pages.

Notice of Allowance in U.S. Appl. No. 12/233,462 on Apr. 5, 2012; 7 pages.

Office Action issued in U.S. Appl. No. 12/233,289 on Oct. 27, 2011; 15 pages.

Notice of Allowance issued in U.S. Appl. No. 12/233,289 on Feb. 15, 2012; 11 pages.

Notice of Allowance issued in U.S. Appl. No. 12/233,457 on Nov. 3, 2011; 12 pages.

Notice of Allowance issued in U.S. Appl. No. 12/327,232 on Nov. 2, 2011; 16 pages.

Notice of Allowance issued in U.S. Appl. No. 12/327,590 on Dec. 28, 2011; 10 pages.

Office Action issued in U.S. Appl. No. 12/327,701 on Nov. 8, 2011; 20 pages.

Notice of Allowance issued in U.S. Appl. No. 12/327,701 on Apr. 6, 2012; 9 pages.

Notice of Allowance issued in U.S. Appl. No. 12/233,087 on Mar. 30, 2012; 30 pages.

Notice of Allowance issued in U.S. Appl. No. 12/233,534 won Dec. 28, 2011; 7 pages.

Notice of Allowanced issued in U.S. Appl. No. 11/322,398 on Oct. 18, 2011; 7 pages.

Examiner's Answer to Appeal Brief issued in U.S. Appl. No. 11/396,236 on Nov. 10, 2011; 19 pages.

Notice of Allowance issued in U.S. Appl. No. 11/396,259 on Jul. 6, 2010; 6 pages.

Notice of Allowance issued in U.S. Appl. No. 11/396,259 on Mar. 15, 2012; 7 pages.

Office Action issued in U.S. Appl. No. 11/396,288 on Oct. 17, 2011; 38 pages.

Notice of Allowance issued in U.S. Appl. No. 11/396,250 on Dec. 7, 2011; 6 pages.

Notice of Allowance issued in U.S. Appl. No. 11/396,258 on Feb. 3, 2012; 12 pages.

Office Action issued in U.S. Appl. No. 11/396,252 on Nov. 10, 2011; 18 pages.

Notice of Allowance issued in U.S. Appl. No. 11/322,851 on Mar. 1, 2012; 9 pages.

Notice of Allowance issued in U.S. Appl. No. 11/322,845; Nov. 13, 2011; 9 pages.

Office Action issued in U.S. Appl. No. 11/397,026; Jul. 21, 2009; 28 pages.

Notice of Allowance issued in U.S. Appl. No. 11/397,026 on Nov. 4, 2011; 8 pages.

Notice of Allowance issued in U.S. Appl. No. 11/397,026 on Feb. 23, 2012; 8 pages.

Notice of Allowance issued in U.S. Appl. No. 12/233,520 on Nov. 10, 2011; 22 pages.

Notice of Allowance issued in U.S. Appl. No. 11/968,054 on Aug. 2, 2011; 5 pages.

Office Action issued in U.S. Appl. No. 12/233,458 on Oct. 12, 2011; 19 pages.

Office Action issued in U.S. Appl. No. 11/967,489 on Sep. 28, 2011; 7 pages.

Office Action issued in U.S. Appl. No. 11/967,489 on Feb. 6, 2012; 9 pages.

Notice of Allowance issued in U.S. Appl. No. 11/967,393 on Nov. 9, 2011; 9 pages.

Notice of Allowance issued in U.S. Appl. No. 12/233,075 on Mar. 22, 2012; 25 pages.

Office Action issued in U.S. Appl. No. 12/233,479 on May 7, 2012; 26 pages.

Office Action issued in U.S. Appl. No. 11/967,387 on Apr. 12, 2012; 13 pages.

* cited by examiner

ARCHITECTURAL DESIGN FOR INTRA-COMPANY STOCK TRANSFER APPLICATION SOFTWARE

BACKGROUND

The subject matter of this patent application relates to computer software architecture, and more particularly to the architecture of application software for intra-company stock transfer of physical inventory.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for an intra-company stock transfer software application.

In various aspects, the invention can be implemented as methods, systems, and apparatus, including computer program products, for implementing a software architecture design for a software application implementing intra-company stock transfer. The application is structured as multiple process components interacting with each other through service operations, each implemented for a respective process component. The process components include a Supply and Demand Matching process, a Customer Requirement Processing process component, a Logistics Execution Control process component, a Site Logistics Processing process component, an Outbound Delivery Processing process component, an Inbound Delivery Processing process component, an Inventory Processing process component, a Production and Site Logistics Auxiliaries process component and a Freight Documents Processing process component.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
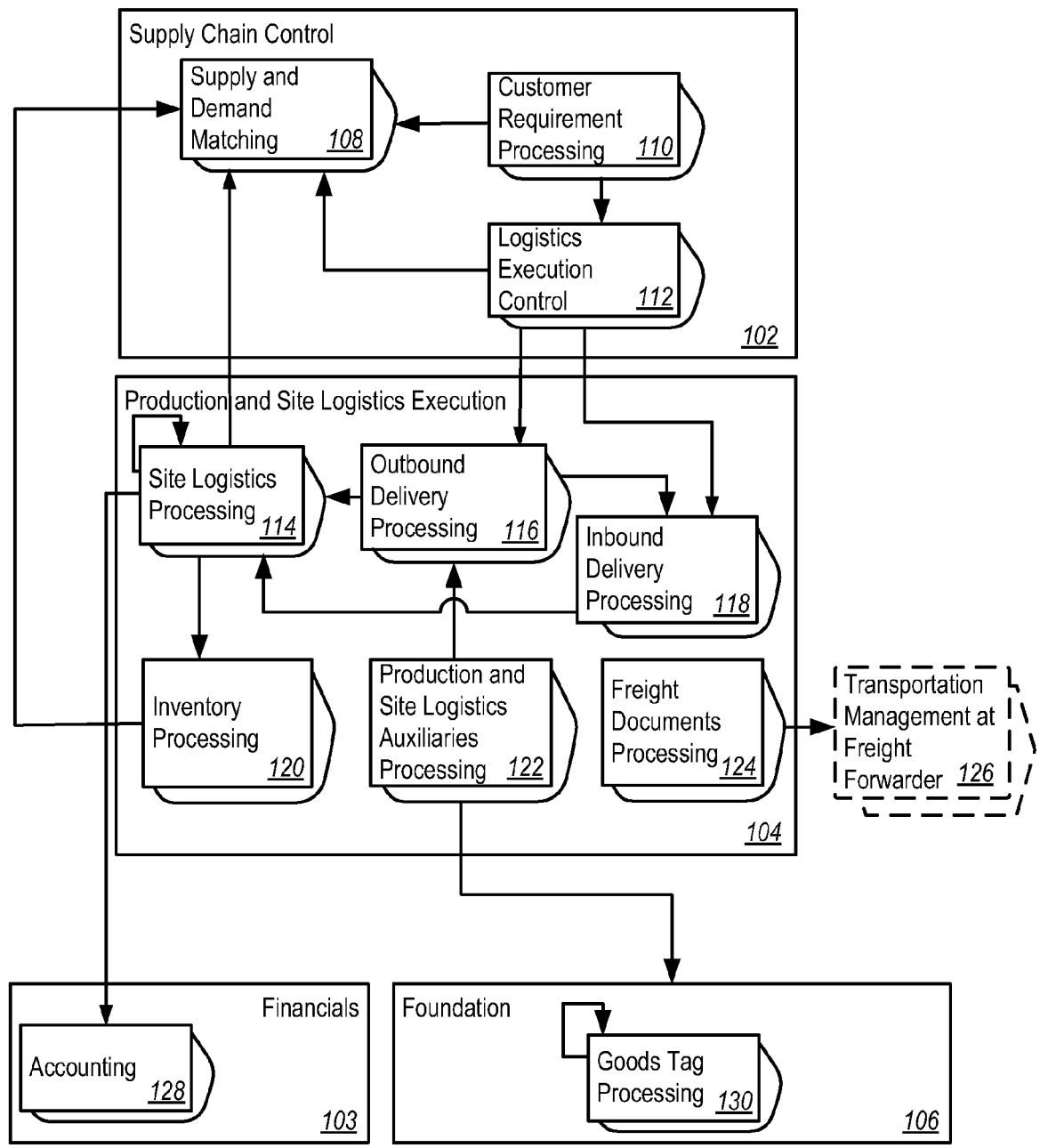
FIG. 1 is a block diagram of a software architectural design for an intra-company stock transfer software application.

FIG. 1 shows the software architectural design for an intra-company stock transfer software application. For example, the intra-company stock transfer application is software that implements a transfer of goods from one stock to another within the same company. As shown in FIG. 1, the intra-company stock transfer design includes three deployment units: a Supply Chain Control deployment unit 102, a Production and Site Logistics Execution deployment unit 104, a Financials deployment unit 103, and a Foundation deployment unit 106. The Supply Chain Control deployment unit 102 manages the planning of on-time demand fulfillment For example, the Supply Chain Control deployment unit 102 can check the availability for demands, match supplies to demands, monitor supplies and demands, and trigger production, procurement, and logistics execution processes.

The Financials deployment unit 103 manages the recording and valuation of business transactions and the estimation of costs and profits. In general, the Financials deployment unit 103 is responsible for both financial and management accounting.

The Production and Site Logistics Execution deployment unit 104 manages the production, assembly, packing, movement, and storage of goods, including the execution of logistic processes, from the receiving of raw materials through to the shipment of a sales item. The Production and Site Logistics Execution deployment unit 104 can manage inbound and outbound deliveries, production, material inspection, site logistics processing, inventory, and physical inventory processing.

The Supply Chain Control deployment unit 102 includes a Supply and Demand Matching process component 108, a Customer Requirement Processing process component 110, and a Logistics Execution Control process component 112. The Supply and Demand Matching process component 108 manages tasks to ensure that sufficient material receipt elements exist to cover material demand while taking available capacity into account. The Customer Requirement Processing process component 110 controls the customer requirements in the supply chain. For example, this can involve checking material availability, receiving, preparing, and passing customer requirements on to supply planning and logistics, and providing feedback on fulfillment. The Logistics Execution Control process component 112 creates, controls, and monitors the supply chain execution activities that are necessary for the fulfillment of an order on a macro-logistics level. For example, the Logistics Execution Control process component 112 can use delivery requests to trigger the necessary site logistics activities and receive information about the supply chain execution progress.

The Financials deployment unit 103 includes an Accounting process component 128. The Accounting process component 128 handles the representation of relevant business transactions for valuation and profitability analysis.

The Production and Site Logistics Execution deployment unit 104 includes a Site Logistics Processing process component 114, an Outbound Delivery Processing process component 116, an Inbound Delivery Processing process component 118, an Inventory Processing process component 120, a Production and Site Logistics Auxiliaries Processing process component 122, and a Freight Documents Processing process component 124. The Site Logistics Processing process component 114 prepares, physically executes, and confirms the logistics processes within a site. The logistics processes, which are based on site logistics process models, generally include picking, shipping, and receiving. The Outbound Delivery Processing process component 116 manages and processes the outbound delivery requirements for shipping goods to a product recipient. For example, the process component 116 combines document based tasks for the outbound delivery process, and enables communication with the originating document (e.g., fulfillment), the product recipient, and invoicing. The Inbound Delivery Processing process component 118 manages and processes the inbound delivery requirements for received goods from a vendor. For example, the process component 118 combines document based tasks for the inbound delivery process, and enables communication with the originating document (e.g., fulfillment), the vendor and invoicing. The Inventory Processing process component 120 manages the inventory and recording of inventory changes. For example, the process component 120 provides services to maintain current stock, content and structure of logistic units and allocations. The Production and Site Logistics Auxiliaries Processing process component 122 supports the functionality valid for multiple process components in the DU Production and Site Logistics Execution. The Freight Documents Processing process component 124 processes the freight-related documents for shipping purposes.

A Transportation Management at Freight Forwarder external process component 126 will be used to describe the architectural design. The Transportation Management at Freight Forwarder process component 126 handles processing external freight in a forwarder system.

The architectural design also includes a Goods Tag Processing process component 130 for processing activities related to goods tags such as the printing of labels. The Goods Tag Processing process component 130 is included in the Foundation layer 106.

Figure 2:
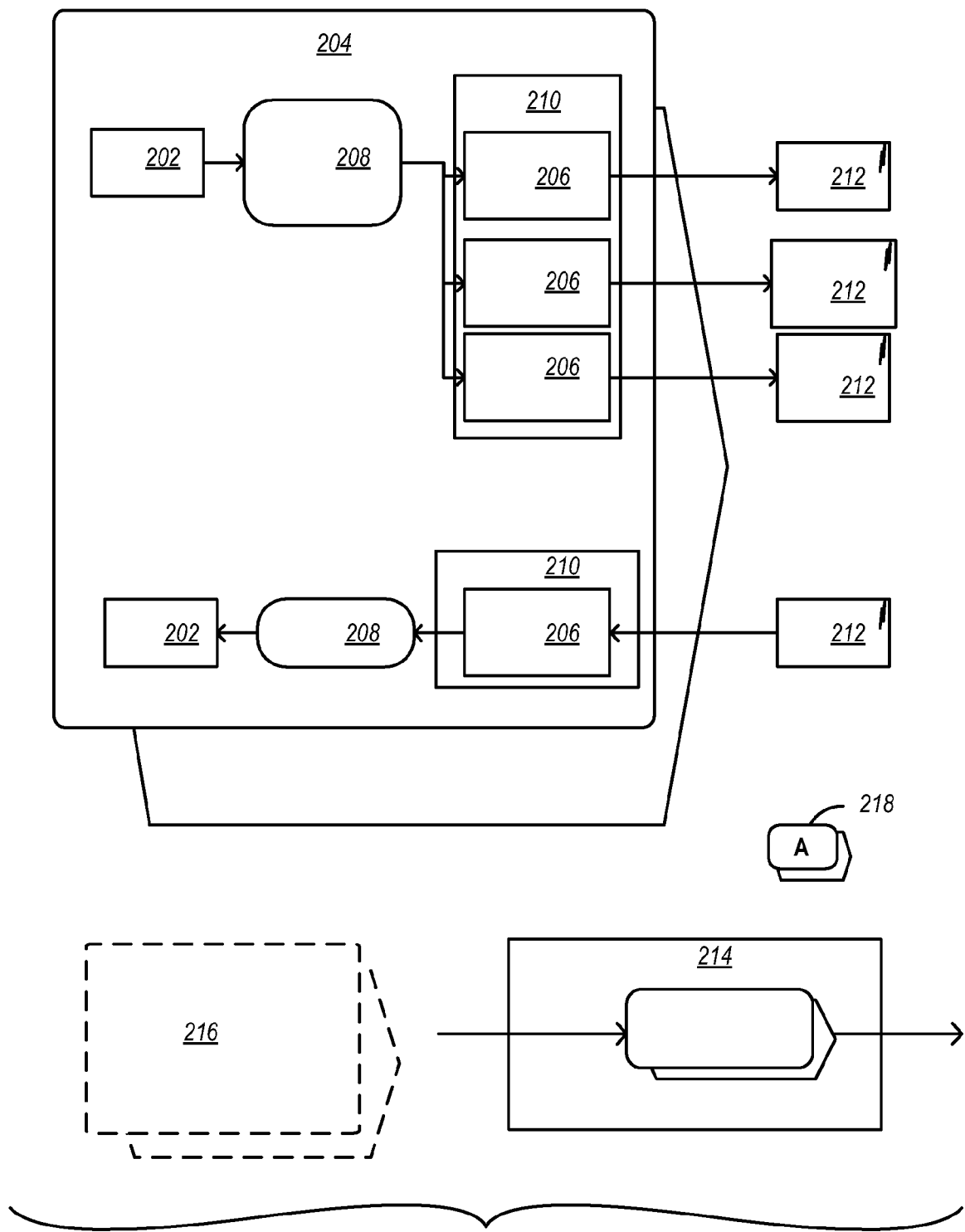
FIG. 2 illustrates the elements of the architecture as they are drawn in the figures.

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

A process component of an external system is drawn as a dashed-line process component (drawn as icon 216). Such a process component is used to represent the external system in describing interactions with the external system; however, this should be understood to require no more of the external system than that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality includes the ability to perform all or parts of particular kinds of business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An outbound process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions Between Process Components "Inventory Processing" and "Supply and Demand Matching"

Figure 3:
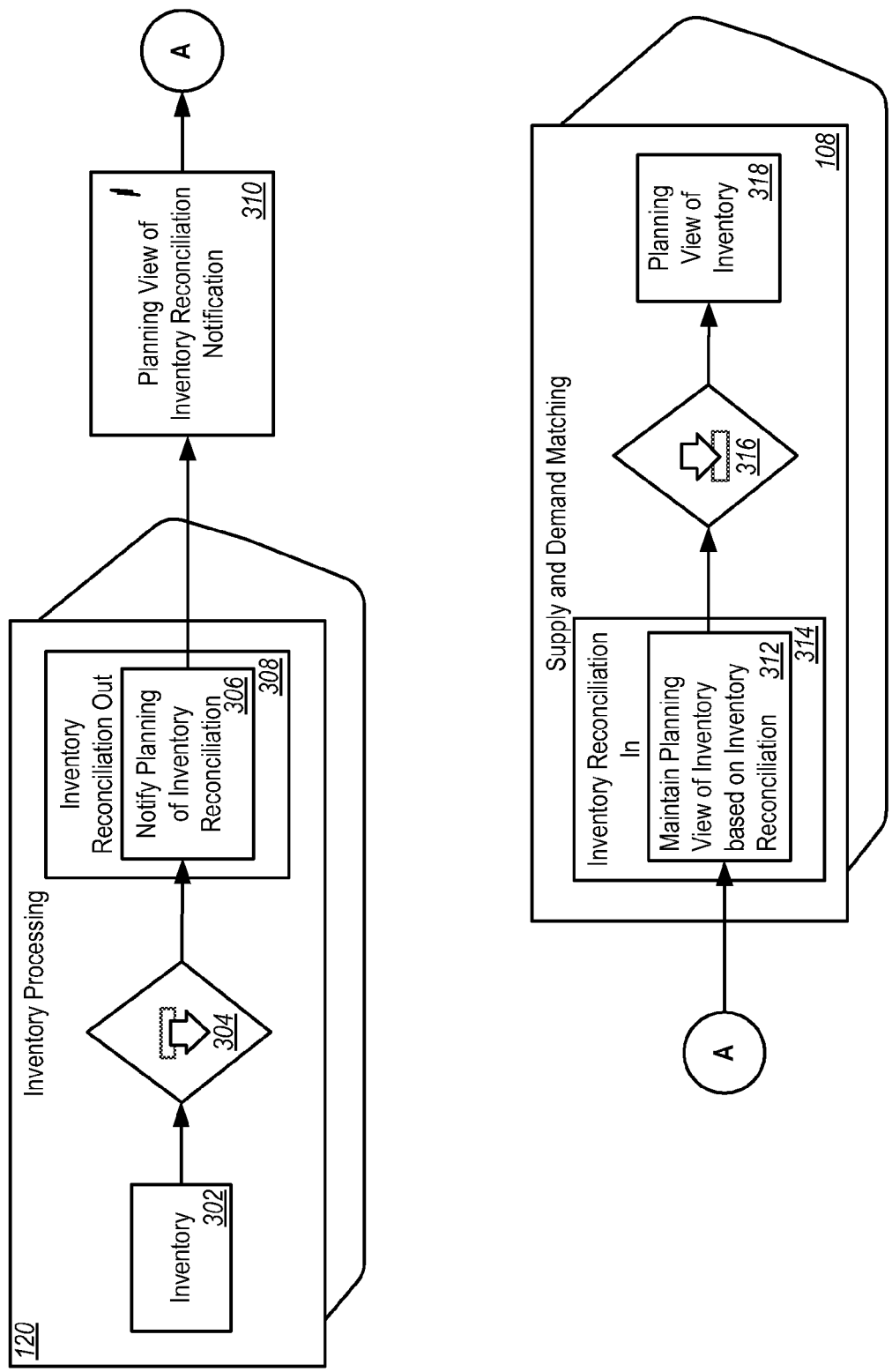
FIG. 3 is a block diagram showing interactions between an Inventory Processing process component and a Supply and Demand Matching process component.

FIG. 3 is a block diagram showing an interactions between the Inventory Processing process component 120 and the Supply and Demand Matching process component 108 in the architectural design of FIG. 1. The interaction can be used for reconciling of the actual quantities of the planning view of inventory in Supply and Demand Matching process component 108 with the actual quantities of the original inventory in the Inventory Processing process component 120 if a deviation is detected.

As shown in FIG. 3, the Inventory Processing process component 120 includes an Inventory business object 302. The Inventory business object 302 represents the quantity of all the materials in a certain location including the material reservations at this location. In some implementations, quantities of materials can be physically grouped using identified logistic units.

The Inventory business object 302 uses a Notify of Inventory Reconciliation from Inventory to Supply and Demand Matching outbound process agent 304 to invoke a Notify Planning of Inventory Reconciliation operation 306. The operation 306 notifies the Supply and Demand Matching process component 108 about the reconciliation of aggregated inventory quantities aggregated on a material and supply planning area level. The Notify Planning of Inventory Reconciliation operation 306 is included in an Inventory Reconciliation Out interface 308. The Notify Planning of Inventory Reconciliation operation 306 sends a Planning View of Inventory Reconciliation Notification message 310 to the Supply and Demand Matching process component 108.

A Maintain Planning View of Inventory based on Inventory Reconciliation operation 312 receives the Planning View of Inventory Reconciliation Notification message 310. The operation 312 is included in an Inventory Reconciliation In interface 314. For example, the Maintain Planning View of Inventory based on Inventory Reconciliation operation 312 maintains total inventory quantities in supply planning.

The Maintain Planning View of Inventory based on Inventory Reconciliation operation 312 uses a Maintain Planning View of Inventory based on Inventory Reconciliation inbound process agent 316 to update a Planning View of Inventory business object 318. The Planning View of Inventory business object 318 represents a view of a material stock aggregated at the level of the supply planning area or at the level of the supply planning area and product requirement specification.

Interactions Between Process Components "Site Logistics Processing" and "Accounting"

Figure 4:
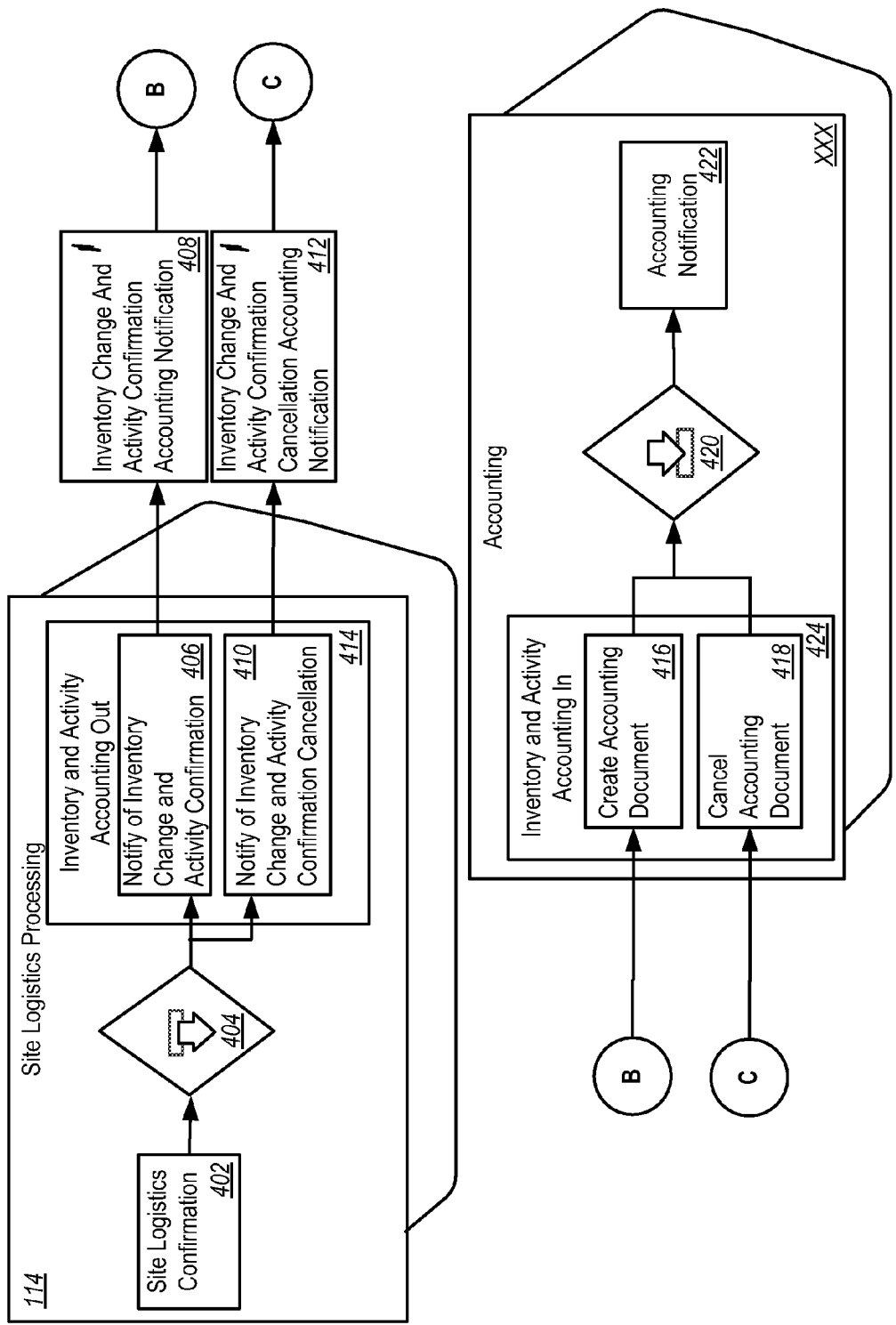
FIG. 4 is a block diagram showing interactions between a Site Logistics Processing process component and an Accounting process component.

FIG. 4 is a block diagram showing interactions between the Site Logistics Processing process component 114 and the Accounting process component 128 in the architectural design of FIG. 1. The interaction starts when a site logistics confirmation is created. For example, the Site Logistics Processing process component 114 notifies the Accounting process component 128 of confirmed or cancelled inventory changes.

The Site Logistics Processing process component 114 includes a Site Logistics Confirmation business object 402. The Site Logistics Confirmation business object 402 represents a record of confirmed logistic process changes which result from the execution of a site logistics process at a specific time (e.g., inventory changes, plan adjustments, resource utilizations, and progress status changes).

The Site Logistics Confirmation business object 402 uses a Notify of Inventory Change from Site Logistics Confirmation to Accounting outbound process agent 404 to invoke a Notify of Inventory Change and Activity Conformation operation 406. For example, the operation 406 notifies the Accounting process component 128 about inventory changes (for physical goods) and activity confirmations, and to trigger a valuation of the relevant inventory changes and activities. The process agent 404 can also invoke a Notify of Inventory Change and Activity Confirmation Cancellation operation 410. For example, the operation 410 notifies the Accounting process component 128 about a cancellation of inventory changes and activity confirmations sent earlier. The operations 406, 410 are included in an Inventory and Activity Accounting Out interface 414.

If the Notify of Inventory Change and Activity Confirmation operation 406 is invoked, an Inventory Change and Activity Confirmation Accounting Notification message 408 is sent to the Accounting process component 128. If the Notify of Inventory Change and Activity Confirmation Cancellation operation 410 is invoked, an Inventory Change and Activity Confirmation Cancellation Accounting Notification message 412 is sent to the Accounting process component 128.

If the Inventory Change and Activity Confirmation Accounting Notification message 408 is received, then a Create Accounting Document operation 416 is invoked. The operation 416 can create an accounting document based on inventory data received from the Inventory Processing, Site Logistics Processing, or Production process components. The received data is first converted into an accounting notification from which one of more accounting documents are created according to the relevant sets of books.

If the Inventory Change and Activity Confirmation Cancellation Accounting Notification message 412 is received then Cancel Accounting Document operation 418 is invoked. The operation 418 can cancel an existing accounting document based on cancellation data received from the Inventory Processing, Site Logistics Processing, or Production process components. The received data is converted into an accounting notification from which one or more reversal accounting documents are created according to the relevant sets of books. The operations 416 and 418 are included in an Inventory and Activity Accounting In interface 424.

The Create Accounting Document operation 416 and the Cancel Accounting Document operation 418 use a Maintain Accounting Document based on Inventory and Activity inbound process agent 420 to update an Accounting Notification business object 422. The Accounting Notification business object 422 represents a notification sent to Financial Accounting by an operational component regarding a business transaction. For example, it represents the operational business transaction in a standardized form for business transaction documents and contains data for valuating the business transaction.

Interactions Between Process Components "Logistics Execution Control" and "Outbound Delivery Processing"

Figure 5:
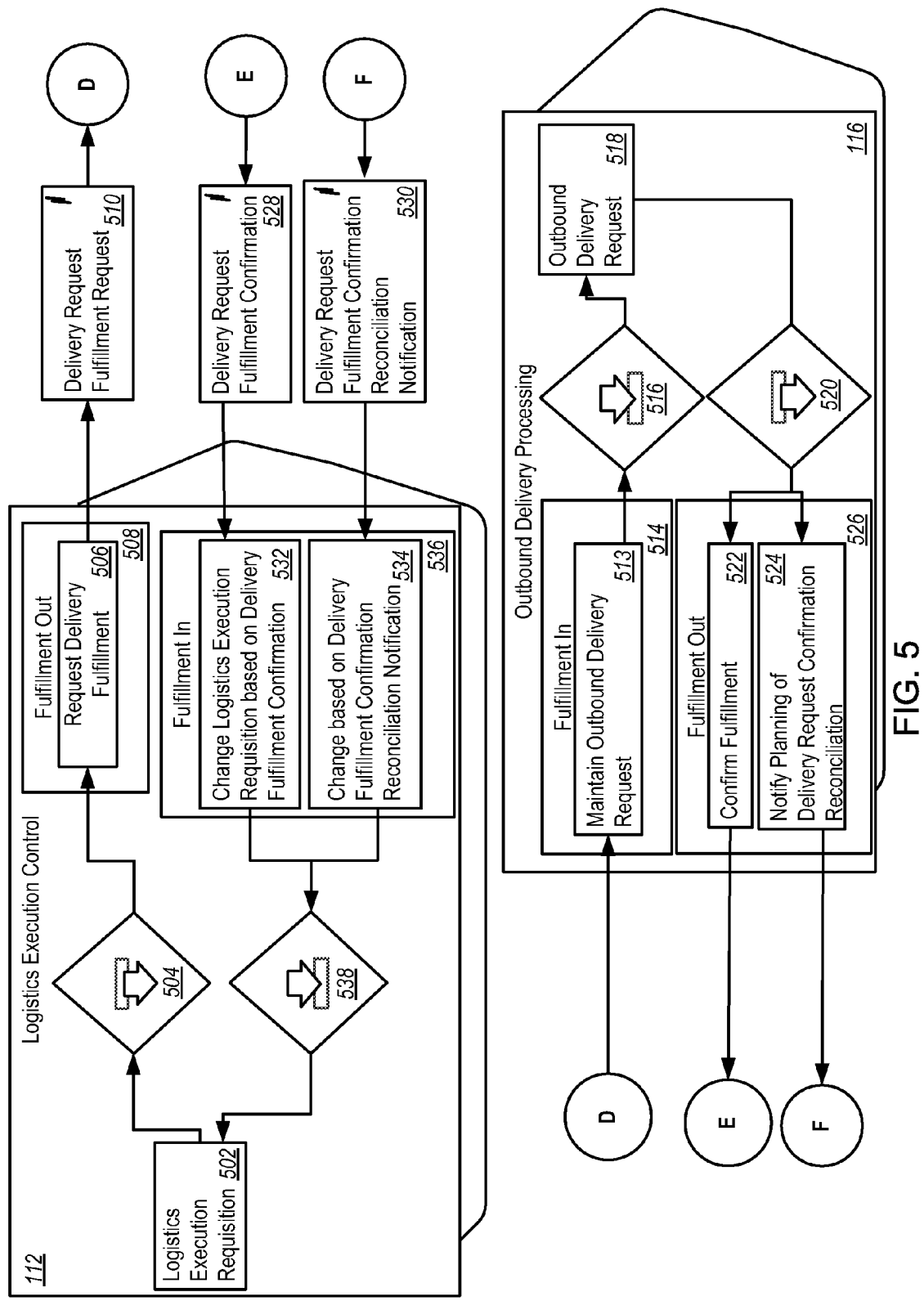
FIG. 5 is a block diagram showing interactions between a Logistics Execution Control process component and an Outbound Delivery Processing process component.

FIG. 5 is a block diagram showing an interaction between the Logistics Execution Control process component 112 and the Outbound Delivery Processing process component 116 in the architectural design of FIG. 1. The interactions include requesting of the creation or update of an outbound delivery request when a logistics execution requisition is released.

As shown in FIG. 5, the Logistics Execution Control process component 112 includes a Logistics Execution Requisition business object 502. The Logistics Execution Requisition business object 502 represents a requisition to Logistics Execution Control to control, trigger, and monitor the execution of a logistics process on a macro-logistics level to fulfill an order.

The Logistics Execution Requisition business object 502 uses a Request Fulfillment from Logistics Execution request to Outbound Delivery Processing outbound process agent 504 to invoke a Request Delivery Fulfillment operation 506. The Request Delivery Fulfillment operation 506 can create or update an inbound or outbound delivery request. The operation 506 is included in a Fulfillment Out interface 508.

The Request Delivery Fulfillment operation 506 sends a Delivery Request Fulfillment Request message 510 to the Outbound Delivery Processing process component 116. If the Delivery Request Fulfillment Request message 510 is received, then a Maintain Outbound Delivery Request operation 513 is invoked. The operation 513 can receive an outbound delivery fulfillment request. The operation 513 is included in a Fulfillment In interface 514.

The Maintain Outbound Delivery Request operation 513 uses a Maintain Outbound Delivery Request inbound process agent 516 to update an Outbound Delivery Request business object 518. The Outbound Delivery Request business object 518 represents a request to a vendor to compose goods for shipping. The Outbound Delivery Request business object 518 uses a Confirm Fulfillment of Outbound Delivery Request to Logistics Execution Control outbound process agent 520 to invoke a Confirm Fulfillment operation 522. For example, the operation 522 can confirm and fulfill an outbound delivery request. The process agent 520 can also invoke the Notify Planning of Delivery Request Confirmation Reconciliation operation 524. For example, the operation 524 can notify the Logistics Execution Control process component 112 of a delivery request fulfillment confirmation for reconciliation purposes. The operations 522 and 524 are included in a Fulfillment Out interface 526.

If the Confirm Fulfillment operation 522 is invoked, a Delivery Request Fulfillment Confirmation message 528 is sent to the Logistics Execution Control process component 112. If the Notify Planning of Delivery Request Confirmation Reconciliation operation 524 is invoked, a Delivery Request Fulfillment Confirmation Reconciliation Notification message 530 is sent to the Logistics Execution Control process component 112.

If the Delivery Request Fulfillment Confirmation message 528 is received, then a Change Logistics Execution Requisition based on Delivery Fulfillment Confirmation operation 532 is invoked. The operation 532 can update a logistics execution requisition with fulfillment confirmation data from an inbound or outbound delivery request, and update supply and demand matching with any planning-relevant inventory changes.

If the Delivery Request Fulfillment Confirmation Reconciliation Notification message 530 is received, then a Change Based on Delivery Fulfillment Confirmation Reconciliation Notification operation 534 is invoked. The operation 534 can reconcile a logistics execution requisition with its related outbound or inbound delivery request. The operations 532 and 534 are included in a Fulfillment In interface 536.

The Change Logistics Execution Requisition based on Delivery Fulfillment Confirmation operation 532 and the Change Based on Delivery Fulfillment Confirmation Reconciliation Notification operation 534 use a Change Logistics Execution Requisition based on Delivery Fulfillment Confirmation inbound process agent 538 to update the Logistics Execution Requisition business object 502.

Interactions Between Process Components "Outbound Delivery Processing" and "Inbound Delivery Processing"

Figure 6:
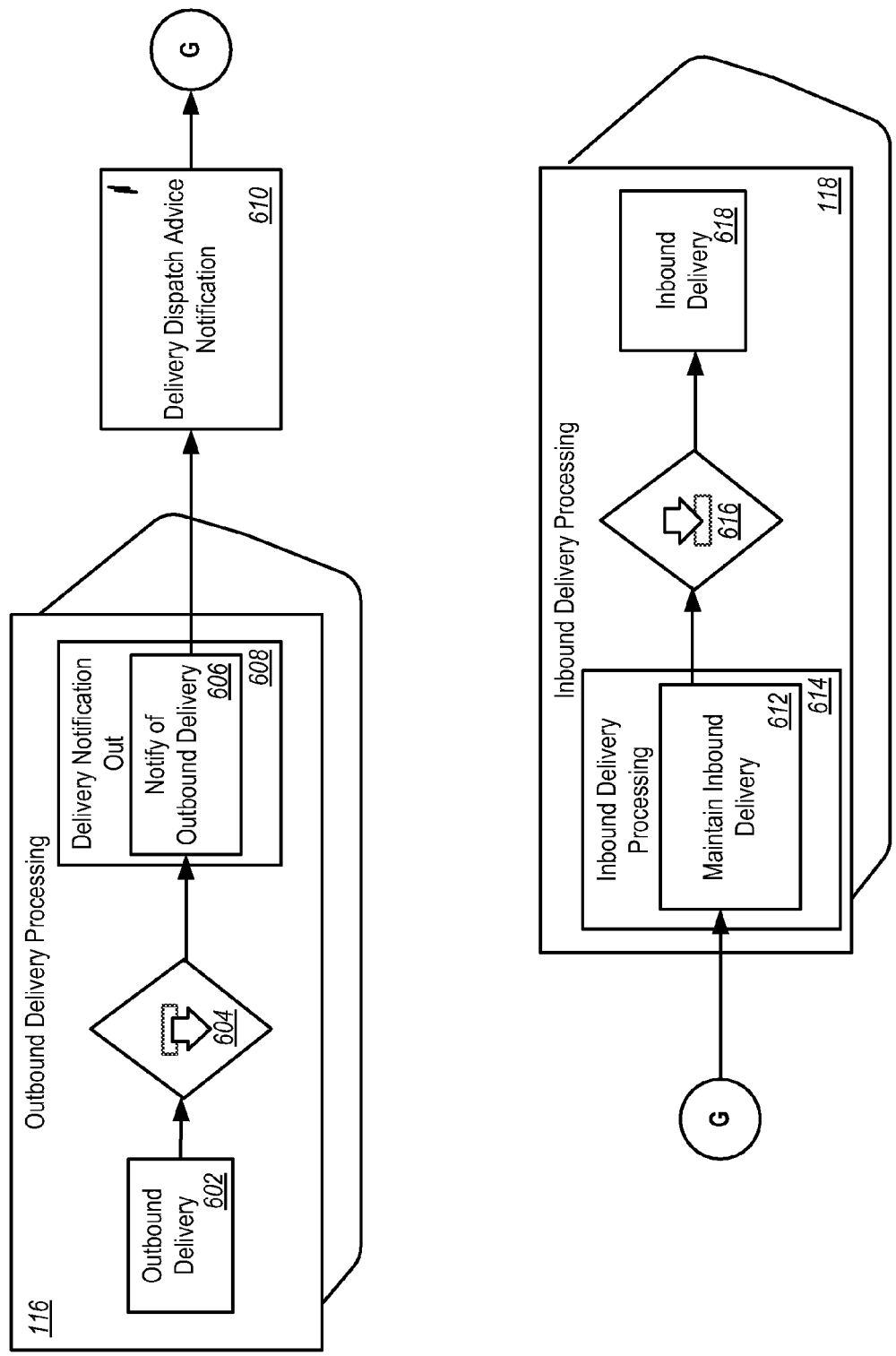
FIG. 6 is a block diagram showing interactions between the Outbound Delivery Processing process component and the Inbound Delivery Processing process component.

FIG. 6 is a block diagram showing interactions between the Outbound Delivery Processing process component 116 and the Inbound Delivery Processing process component 118 in the architectural design of FIG. 1. The interactions include the sending of a delivery dispatch advice notification to an internal business system when an outbound delivery is released or cancelled.

As shown in FIG. 6, the Outbound Delivery Processing process component 116 includes an Outbound Delivery business object 602. The Outbound Delivery business object 602 represents a composition of the goods that is provided for shipping by a vendor.

The Outbound Delivery business object 602 uses a Notify of Outbound Delivery to Inbound Delivery Processing at Customer outbound process agent 604 to invoke a Notify of Outbound Delivery operation 606. The operation 606 requests to send a delivery dispatch advice notification. The operation 606 is included in a Delivery Notification Out interface 608. The Notify of Outbound Delivery operation 606 sends a Delivery Dispatch Advice Notification message 610 to the Inbound Delivery Processing process component 118.

The Maintain Inbound Delivery operation 612 receives the Delivery Dispatch Advice Notification message 610. For example, the Maintain Inbound Delivery operation 612 receives a delivery dispatch advice notification from a supplier. The operation 612 is included in a Delivery Notification In interface 614.

The Maintain Inbound Delivery operation 612 uses a Maintain Inbound Delivery inbound process agent 616 to update an Inbound Delivery business object 618. The Inbound Delivery business object 618 represents a composition of the goods that are received by a product recipient.

Interactions Between Process Components "Logistics Execution Control" and "Inbound Delivery Processing"

Figure 7:
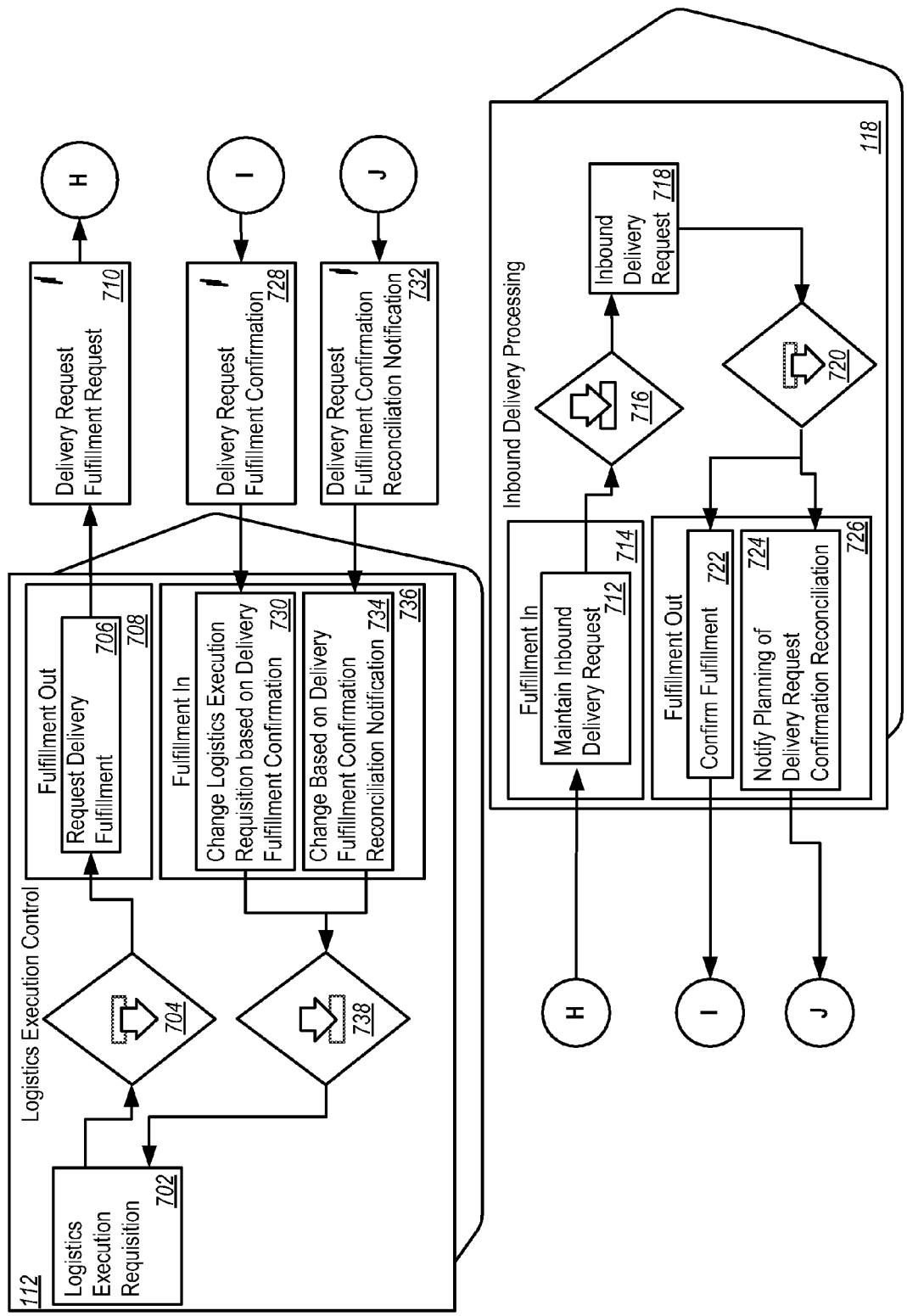
FIG. 7 is a block diagram showing interactions of the Logistics Execution Control Processing process component and an Inbound Delivery Processing process component.

FIG. 7 is a block diagram showing interactions between the Logistics Execution Control process component 112 and the Inbound Delivery Processing process component 118 in the architectural design of FIG. 1. The interaction can include the requesting of the creation or update of an inbound delivery request when a logistics execution requisition is released.

As shown in FIG. 7, the Logistics Execution Control process component 112 includes a Logistics Execution Requisition business object 702. The Logistics Execution Requisition business object 702 represents a requisition to Logistics Execution Control to control, trigger, and monitor the execution of a logistics process on a macro-logistics level to fulfill an order.

The business object 702 uses a Request Fulfillment from Logistics Execution Request to Inbound Delivery Processing outbound process agent 704 to invoke a Request Delivery Fulfillment operation 706. The Request Delivery Fulfillment operation 706 can create or update an inbound or outbound delivery request. The operation 706 is included in a Fulfillment Out interface 708.

The Request Delivery Fulfillment operation 706 sends a Delivery Request Fulfillment Request message 710 to the Inbound Delivery Processing process component 118. A Maintain Inbound Delivery Request operation 712 receives the Delivery Request Fulfillment Request message 710. The message 710 can include an inbound delivery fulfillment request. The operation 712 is included in a Fulfillment In interface 714.

The Maintain Inbound Delivery Request operation 712 uses Maintain Inbound Delivery Request inbound process agent 716 to update an Inbound Delivery Request business object 718. The Inbound Delivery Request business object 718 represents a request to a production recipient to receive a composition of goods.

The Inbound Delivery Request business object 718 uses a Confirm Fulfillment of Inbound Delivery Request to Logistics Execution Control outbound process agent 720 to invoke a Confirm Fulfillment operation 722. The operation 722 can confirm the fulfillment of an outbound delivery request. The process agent 720 can also invoke a Notify Planning of Delivery Request Confirmation Reconciliation operation 724 The operation 724 can notify the Logistics Execution Control process component 112 of a delivery request fulfillment confirmation for reconciliation purposes. The operations 722 and 724 are included in a Fulfillment Out interface 726.

The Confirm Fulfillment operation 722 sends a Delivery Request Fulfillment Confirmation message 728 to the Logistics Execution Control process component 112. The Change Logistics Execution Requisition based on Delivery Fulfillment Confirmation operation 730 receives the message 728. For example, the operation updates a logistic executing requisition with fulfillment confirmation data from an inbound or outbound delivery request, and updates supply and demand matching with any planning-relevant inventory changes.

The Notify Planning of Delivery Request Confirmation Reconciliation operation 724 sends a Delivery Request Fulfillment Confirmation Reconciliation Notification message 732 to the Logistics Execution Control process component 112. The Change Based on Delivery Fulfillment Confirmation Reconciliation Notification operation 734 receives the message 732. The operation 734 can reconcile a logistics execution requisition with its related outbound or inbound delivery request. The operations 730 and 734 are included in a Fulfillment In interface 736.

The operations 730 and 734 use a Change Logistics Execution Requisition based on Delivery Fulfillment Confirmation inbound process agent 738 to update the Logistics Execution Requisition business object 702.

Interactions of Process Component "Goods Tag Processing"

Figure 8:
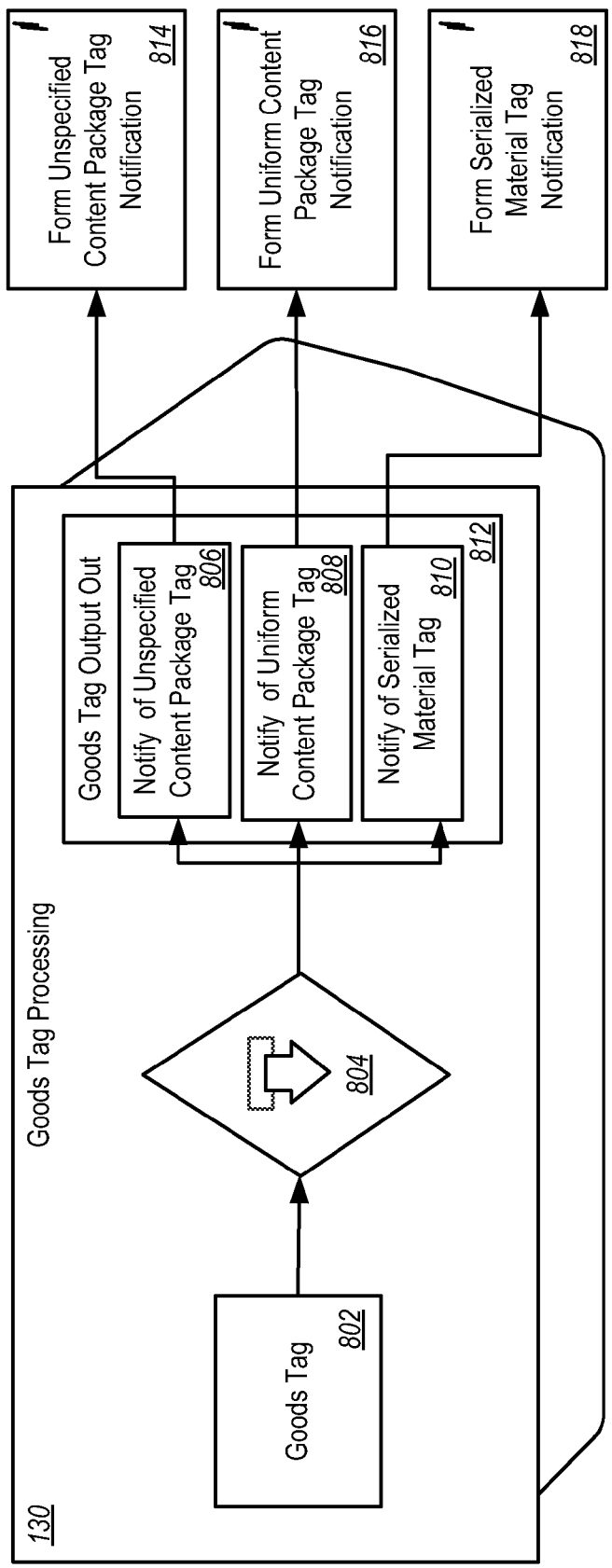
FIG. 8 is a block diagram showing the interactions of a Goods Tag Processing process component.

FIG. 8 is a block diagram showing interactions of the Goods Tag Processing process component 130 in the architectural design of FIG. 1. The interactions can be used for the requesting of the output of all types of good tags.

As shown in FIG. 3, the Goods Tag Processing process component 130 includes a Goods Tag business object 802. The Goods Tag business object 802 represents an electronic device, a small piece or part, or a label that is attached to a product or package and that contains selected information about this product or package. Its purpose is to present this information to a reader.

The Goods Tag business object 802 uses a Notify of Goods Tag for Output outbound process agent 804 to invoke a Notify of Unspecified Content Package Tag operation 806. For example, the operation 806 can request the output of goods tags of the type "unspecified content package tag." The outbound process agent 804 can also invoke a Notify of Uniform Content Package Tag operation 808. For example, the operation 808 can request the output of goods tags of the type "uniform content package tag." The outbound process agent 804 can also invoke a Notify of Serialized Material Tag operation 810. For example, the operation 810 can request the output of goods tags of the type "serialized material tag." The operations 806, 808, and 810 are included in a Goods Tag Output Out interface 812.

The Notify of Unspecified Content Package Tag operation 806 generates a Form Unspecified Content Package Tag notification message 814. The Notify of Uniform Content Package Tag operation 808 generates a Form Uniform Content Package Tag Notification message 816. The Notify of Serialized Material Tag operation 810 generates a Form Serialized Material Tag Notification message 818.

Interactions of Process Component "Site Logistics Processing"

Figure 9:
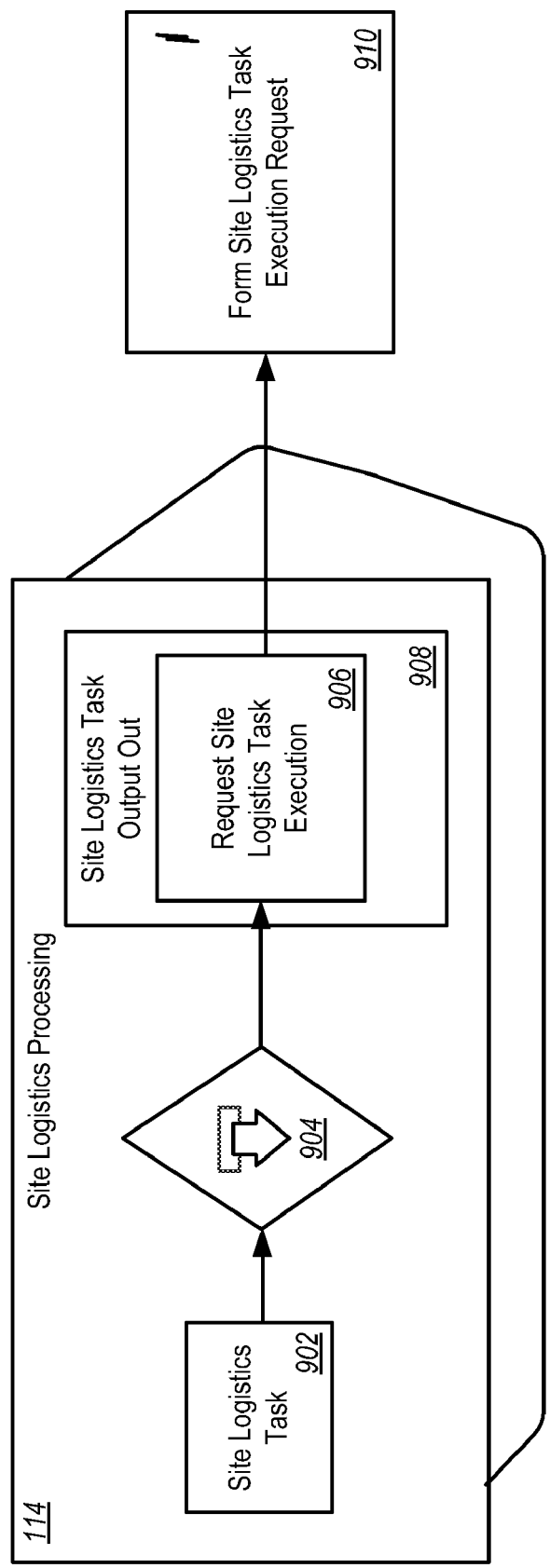
FIG. 9 is a block diagram showing the interactions of the Site Logistics Processing process component.

FIG. 9 is a block diagram showing interactions of the Site Logistics process component 114 in the architectural design of FIG. 1. The interactions can be used for the requesting of the printing of task instructions from Site Logistics Processing.

As shown in FIG. 9, the Site Logistics Processing process component 114 includes a Site Logistics Task business object 902. The Site Logistics Task business object 902 represents a task for executing a logistics operation or activity within a site. It represents a piece of work to be performed by a person or an automated system.

The Site Logistics Task business component 902 uses Request Site Logistics Task Execution for Output outbound process agent 904 to invoke a Request Site Logistics Task Execution operation 906. For example, the operation 906 requests the printing of site logistics task instructions. The operation 906 is included in a Site Logistics Task Output Out interface 908. The Request Site Logistics Task Execution operation 906 generates a Form Site Logistics Task Execution Request message 910.

Interactions Between Process Component "Freight Documents Processing" and "Transportation Management at Freight Forwarder"

Figure 10:
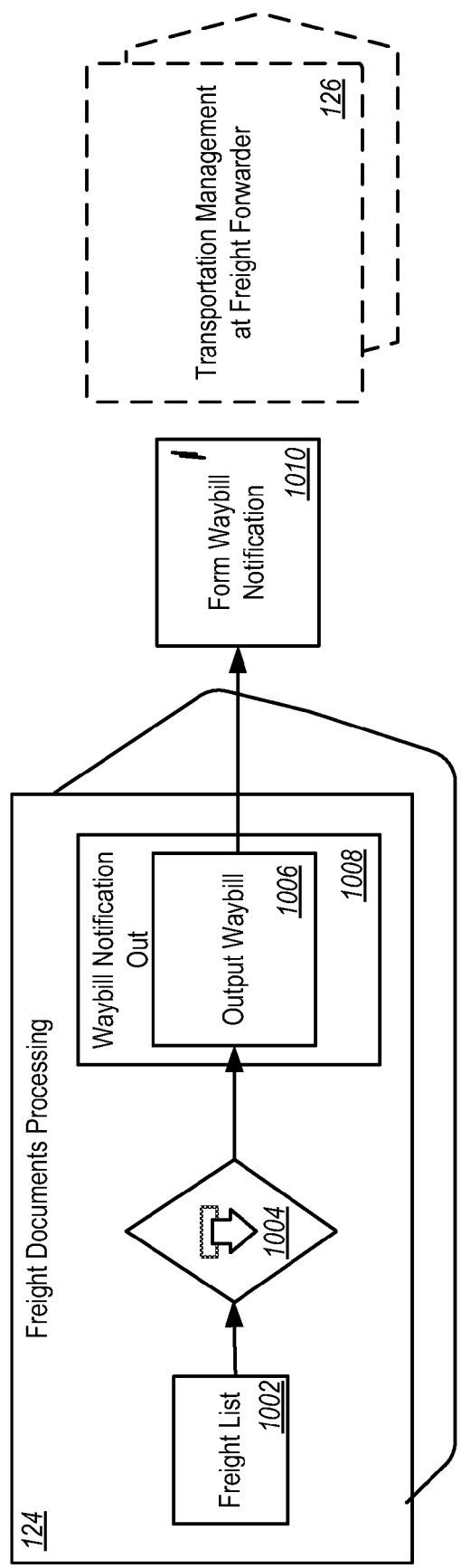
FIG. 10 is a block diagram showing the interactions of a Freight Documents Processing process component.

FIG. 10 is a block diagram showing interactions between the Freight Documents Processing process component 124 and the Transportation Management at Freight Forwarder external process component 126 in the architectural design of FIG. 1. The interactions include the output of a waybill to an external freight forwarder system.

As shown in FIG. 10, the Freight Documents Processing process component 124 includes a Freight List business object 1002. The Freight List business object 1002 represents a document detailing a list of shipped goods that are to be transported, the business partners, and the mode of transportation.

The Freight List business object 1002 uses a Notify of Freight List for Output to Transportation Management at Freight Forwarder outbound process agent 1004 to invoke a Output Waybill operation 1006. The operation 1006 requests the printing of a waybill. The operation 1006 is included in a Waybill Notification Out interface 1008. The Output Waybill operation 1006 sends a Form Waybill Notification message 1010 to the Transportation Management at Freight Forwarder external process component 126.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:

a supply and demand matching process component that manages the tasks used to ensure that sufficient material receipt elements exist to cover material demand while taking available capacity into account;

a customer requirement processing process component that controls the customer requirements in the supply chain;

a logistics execution control process component that creates, controls, and monitors the supply chain execution activities used for the fulfillment of an order on a macro-logistics level;

a site logistics processing process component that prepares, executes, and confirms the logistics processes associated with a site;

an outbound delivery processing process component that manages and processes the outbound delivery requirements for shipping goods to a product recipient:

an inbound delivery processing process component that manages and processes the inbound delivery requirements for received goods from a vendor;

an inventory processing process component that manages the inventory and recording of inventory changes;

an accounting process component that handles the representation of relevant business transactions for valuation and profitability analysis;

a production and site logistics auxiliaries processing process component that supports the functionality valid for multiple process components; and a freight documents processing process component that processes the freight-related documents for shipping purposes; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the inventory processing process component and the supply and demand matching process component, where the pair-wise interaction between the inventory processing process component and the supply and demand matching process component includes the transmission of:

a planning view of inventory reconciliation notification message from the inventory processing process component to the supply and demand matching process component, the planning view of inventory reconciliation notification message comprising a notification to the supply and demand matching process component regarding reconciliation of aggregated inventory quantities aggregated on a material and supply planning area level;

the site logistics processing process component and the accounting process component, where the pair-wise interaction between the site logistics processing process component and the accounting process component includes the transmission of:

an inventory change and activity confirmation accounting notification message from the site logistics processing process component to the accounting process component, the inventory change and activity confirmation accounting notification message comprising a notification to accounting regarding inventory changes for physical goods and activity confirmation, and to trigger a valuation of the relevant inventory changes and activities; and an inventory change and activity confirmation cancellation accounting notification message from the site logistics processing process component to the accounting process component, the inventory change and activity confirmation cancellation accounting notification message comprising a notification to accounting about a cancellation of previously-sent inventory changes and activity confirmations;

the logistics execution control process component and the outbound delivery processing process component, where the pair-wise interaction between the logistics execution control process component and the outbound delivery processing process component includes the transmission of:

a first delivery request fulfillment request message from the logistics execution control process component to the outbound delivery processing process component, the delivery request fulfillment request message comprising a request to create or update an outbound delivery request;

a first delivery request fulfillment confirmation message from the outbound delivery processing process component to the logistics execution control process component, the delivery request fulfillment confirmation message comprising a notification to confirm and fulfill an outbound delivery request; and a first delivery request fulfillment confirmation reconciliation notification message from the outbound delivery processing process component to the logistics execution control process component, the delivery request fulfillment confirmation reconciliation notification message comprising a notification of a confirmation of a delivery request fulfillment for reconciliation purposes;

the logistics execution processing process component and the inbound delivery processing process component, where the pair-wise interaction between the logistics execution control process component and the outbound delivery processing process component includes the transmission of:

a second delivery request fulfillment request message from the logistics execution control process component to the inbound delivery processing process component, the delivery request fulfillment request message comprising a request to create or update an inbound delivery request;

a second delivery request fulfillment confirmation message from the inbound delivery processing process component to the logistics execution control process component, the second delivery request fulfillment confirmation message comprising a notification to confirm and fulfill an inbound delivery request; and a second delivery request fulfillment confirmation reconciliation notification message from the inbound delivery processing process component to the logistics execution control process component, the second delivery request fulfillment confirmation reconciliation notification message comprising a notification of a confirmation of a delivery request fulfillment for reconciliation purposes; and the outbound delivery processing process component and the inbound delivery processing process component, where the pair-wise interaction between the outbound delivery processing process component and the inbound delivery processing process component includes the transmission of:

a delivery dispatch advice notification message from the outbound delivery processing process component to the inbound delivery processing process component, the delivery dispatch advice notification message comprising a notification to an internal business system when an outbound delivery is released or cancelled.

2. The product of claim 1, wherein:

each of the plurality of process components is associated with no more than one deployment unit among a plurality of deployment units, and each deployment unit is deployable on a separate computer hardware platform independent of every other deployment unit; and all interaction between a process component in one deployment unit and any other process component in any other deployment unit takes place through the respective service interfaces of the two process components.

3. The product of claim 2, wherein the deployment units comprise:
a production and site logistics execution deployment unit that includes the site logistics processing process component, the outbound delivery processing process component, the inbound delivery processing process component, the freight documents processing process component, the production and site logistics auxiliaries processing process component, and the inventory processing process component; and
a supply chain control deployment unit that includes the supply and demand matching process component, the customer requirement processing process component, and the logistics execution control process component.

4. The product of claim 1, wherein:
each of the process components includes one or more business objects; and
none of the business objects of any one of the process components interacts directly with any of the business objects included in any of the other process components.

5. The product of claim 4, wherein the business objects comprise a business process object.

6. The product of claim 4, wherein none of the business objects included in any one of the process components is included in any of the other process components.

7. The product of claim 1, at least a subset of the process components including at least one process agent, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

8. The product of claim 7, wherein each inbound process agent comprises a first inbound process agent operable to start an execution of a business process step requested in a first inbound message by creating or updating at least one business object instance.

9. The product of claim 7, wherein the outbound process agents comprise a first asynchronous outbound process agent that is called after a business object that is associated with the first outbound process agent changes.

10. The product of claim 1, wherein the operations comprise synchronous and asynchronous operations.

11. A system, comprising:
a computer system comprising at least one hardware platform for executing computer instructions, the computer instructions structured as a plurality of process components interacting with each other through service interfaces, each hardware platform including at least one processor for executing the computer instructions;
memory storing a plurality of process components executable by the respective at least one processor of the particular hardware platform, each of the process components comprising a modular and application-independent package of reusable, granular software implementing a respective and distinct business process, the business process comprising functionality exposed by the process component via at least one service interface, the plurality of process components including:
a supply and demand matching process component that manages the tasks used to ensure that sufficient material receipt elements exist to cover material demand while taking available capacity into account;
a customer requirement processing process component that controls the customer requirements in the supply chain;
a logistics execution control process component that creates, controls, and monitors the supply chain execution activities used for the fulfillment of an order on a macro-logistics level;
a site logistics processing process component that prepares, executes, and confirms the logistics processes associated with a site;
an outbound delivery processing process component that manages and processes the outbound delivery requirements for shipping goods to a product recipient:
an inbound delivery processing process component that manages and processes the inbound delivery requirements for received goods from a vendor;
an inventory processing process component that manages the inventory and recording of inventory changes;
an accounting process component that handles the representation of relevant business transactions for valuation and profitability analysis;
a production and site logistics auxiliaries processing process component that supports the functionality valid for multiple process components; and
a freight documents processing process component that processes the freight-related documents for shipping purposes; and
the memory further storing a plurality of service interfaces, each service interface associated with exactly one process component and comprising at least one operation, each being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based, pair-wise interaction between the respective process components of the respective operations, the pair-wise interactions between pairs of the process components including interactions between:
the inventory processing process component and the supply and demand matching process component, where the pair-wise interaction between the inventory processing process component and the supply and demand matching process component includes the transmission of:
a planning view of inventory reconciliation notification message from the inventory processing process component to the supply and demand matching process component, the planning view of inventory reconciliation notification message comprising a notification to supply and demand matching regarding reconciliation of aggregated inventory quantities aggregated on a material and supply planning area level;
the site logistics processing process component and the accounting process component, where the pair-wise interaction between the site logistics processing process component and the accounting process component includes the transmission of:
an inventory change and activity confirmation accounting notification message from the site logistics processing process component to the accounting process component, the inventory change and activity confirmation accounting notification message comprising a notification to accounting regarding inventory changes for physical goods and activity confirmation, and to trigger a valuation of the relevant inventory changes and activities; and an inventory change and activity confirmation cancellation accounting notification message from the site logistics processing process component to the accounting process component, the inventory change and activity confirmation cancellation accounting notification message comprising a notification to accounting about a cancellation of previously-sent inventory changes and activity confirmations;

the logistics execution control process component and the outbound delivery processing process component, where the pair-wise interaction between the logistics execution control process component and the outbound delivery processing process component includes the transmission of:

a first delivery request fulfillment request message from the logistics execution control process component to the outbound delivery processing process component, the delivery request fulfillment request message comprising a request to create or update an outbound delivery request;

a first delivery request fulfillment confirmation message from the outbound delivery processing process component to the logistics execution control process component, the delivery request fulfillment confirmation message comprising a notification to confirm and fulfill an outbound delivery request; and a first delivery request fulfillment confirmation reconciliation notification message from the outbound delivery processing process component to the logistics execution control process component, the delivery request fulfillment confirmation reconciliation notification message comprising a notification of a confirmation of a delivery request fulfillment for reconciliation purposes;

the logistics execution processing process component and the inbound delivery processing process component, where the pair-wise interaction between the logistics execution control process component and the outbound delivery processing process component includes the transmission of:

a second delivery request fulfillment request message from the logistics execution control process component to the inbound delivery processing process component, the delivery request fulfillment request message comprising a request to create or update an inbound delivery request;

a second delivery request fulfillment confirmation message from the inbound delivery processing process component to the logistics execution control process component, the second delivery request fulfillment confirmation message comprising a notification to confirm and fulfill an inbound delivery request; and a second delivery request fulfillment confirmation reconciliation notification message from the inbound delivery processing process component to the logistics execution control process component, the second delivery request fulfillment confirmation reconciliation notification message comprising a notification of a confirmation of a delivery request fulfillment for reconciliation purposes; and the outbound delivery processing process component and the inbound delivery processing process component, where the pair-wise interaction between the outbound delivery processing process component and the inbound delivery processing process component includes the transmission of:

a delivery dispatch advice notification message from the outbound delivery processing process component to the inbound delivery processing process component, the delivery dispatch advice notification message comprising a notification to an internal business system when an outbound delivery is released or cancelled.

12. The system of claim 11, wherein:

each of the process components includes one or more business objects; and none of the business objects of any one of the process components interacts directly with any of the business objects included in any of the other process components.

13. The system of claim 11, wherein none of the business objects included in any one of the process components is included in any of the other process components.

14. The system of claim 11, wherein at least a subset of the process components includes at least one process agent, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

15. The system of claim 11, the system comprising multiple hardware platforms, wherein:

the site logistics processing process component, the outbound delivery processing process component, the inbound delivery process component, the production and site logistics auxiliaries processing process component, and the inventory processing process component are deployed on a first hardware platform;

the accounting process component is deployed on a second hardware platform; and the supply and demand matching process component, the customer requirement processing process component, and the logistics execution control process component are deployed on a third hardware platform.

16. The system of claim 15, wherein each of the first through the third hardware platforms are distinct and separate from each other.

* * * * *